US012293866B2

(12) United States Patent
Arai et al.

(10) Patent No.: US 12,293,866 B2
(45) Date of Patent: May 6, 2025

(54) INDUCTOR

(71) Applicant: Murata Manufacturing Co., Ltd., Kyoto-fu (JP)

(72) Inventors: Takumi Arai, Nagaokakyo (JP); Motoki Toyama, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 708 days.

(21) Appl. No.: 17/703,932

(22) Filed: Mar. 24, 2022

(65) Prior Publication Data

US 2022/0310315 A1 Sep. 29, 2022

(30) Foreign Application Priority Data

Mar. 26, 2021 (JP) ................................ 2021-054099

(51) Int. Cl.
*H01F 27/29* (2006.01)
*H01F 27/25* (2006.01)
*H01F 27/255* (2006.01)
*H01F 27/26* (2006.01)

(52) U.S. Cl.
CPC ......... *H01F 27/292* (2013.01); *H01F 27/255* (2013.01); *H01F 27/266* (2013.01)

(58) Field of Classification Search
CPC ..... H01F 27/292; H01F 27/255; H01F 27/266
See application file for complete search history.

(56) References Cited

U.S. PATENT DOCUMENTS

2008/0012674 A1* 1/2008 Sano .................... H05K 1/0233 336/83
2019/0272945 A1* 9/2019 Arai ........................ H01F 27/28
2020/0075222 A1* 3/2020 Ogasawara ........... H01F 17/045
2020/0090850 A1* 3/2020 Isobe .................... H01F 27/292
2021/0020356 A1* 1/2021 Oka ........................ H01F 27/29
2021/0375519 A1* 12/2021 Wang ...................... H01F 17/04

FOREIGN PATENT DOCUMENTS

DE 3908896 A1 * 9/1989
WO 2006/070544 A1 7/2006

* cited by examiner

*Primary Examiner* — Malcolm Barnes
(74) *Attorney, Agent, or Firm* — Studebaker Brackett PLLC

(57) ABSTRACT

An inductor including a conductor having a plate thickness is embedded in a core containing magnetic powder. The core includes a mounting surface facing a mounting substrate side at the time of mounting, an upper surface facing the mounting surface, and a pair of end surfaces orthogonal to the mounting surface. The conductor includes a conductive wire extending inside the core over the pair of end surfaces, and a pair of electrode terminals. Each electrode terminal includes an electrode portion at respective end portions of the conductive wire and exposed to the mounting surface, and first and second bent portions having a first bend and second bend, respectively, which are each 2.0 times to 3.0 times the plate thickness. When one of the first and second bends is 2.0 times or more the plate thickness, the other is less than 3.0 times the plate thickness.

12 Claims, 9 Drawing Sheets

FIG. 8

| | DIMENSION | | | | | | | | | CHARACTERISTIC EVALUATION | | |
|---|---|---|---|---|---|---|---|---|---|---|---|---|
| | PLATE THICKNESS GT | CONDUCTIVE WIRE WIDTH WA | FIRST BEND R1 | INTERMEDIATE PORTION LENGTH GB | SECOND BEND R2 | CONDUCTOR THICKNESS G | LOWER CORE THICKNESS TD | UPPER CORE THICKNESS TU | THICKNESS T | LOW HEIGHT EVALUATION | INDUCTANCE EVALUATION | DC RESISTANCE VALUE EVALUATION |
| SAMPLE A1 | 0.06 | 0.50 | 0.12 | 0.00 | 0.12 | 0.24 | 0.18 | 0.18 | 0.42 | G | NG | NG |
| SAMPLE A2 | | 0.50 | 0.18 | 0.00 | 0.18 | 0.36 | 0.30 | 0.30 | 0.66 | G | G | NG |
| SAMPLE A3 | | 0.50 | 0.24 | 0.00 | 0.24 | 0.48 | 0.42 | 0.42 | 0.90 | G | G | NG |
| SAMPLE B1 | 0.08 | 0.50 | 0.18 | 0.00 | 0.16 | 0.32 | 0.24 | 0.24 | 0.56 | G | NG | NG |
| SAMPLE B2 | | 0.50 | 0.24 | 0.00 | 0.24 | 0.48 | 0.40 | 0.40 | 0.88 | G | G | NG |
| SAMPLE B3 | | 0.50 | 0.32 | 0.00 | 0.32 | 0.64 | 0.56 | 0.56 | 1.20 | NG | G | NG |
| SAMPLE C1 | 0.10 | 0.50 | 0.20 | 0.00 | 0.20 | 0.40 | 0.30 | 0.30 | 0.70 | G | G | G |
| SAMPLE C2 | | 0.50 | 0.30 | 0.00 | 0.20 | 0.50 | 0.40 | 0.40 | 0.90 | G | G | G |
| SAMPLE C3 | | 0.50 | 0.30 | 0.00 | 0.30 | 0.60 | 0.50 | 0.50 | 1.10 | NG | G | G |
| SAMPLE C4 | | 0.50 | 0.25 | 0.00 | 0.25 | 0.50 | 0.40 | 0.40 | 0.90 | G | G | G |
| SAMPLE D1 | 0.12 | 0.50 | 0.24 | 0.00 | 0.24 | 0.48 | 0.36 | 0.36 | 0.84 | G | NG | G |
| SAMPLE D2 | | 0.50 | 0.36 | 0.00 | 0.36 | 0.72 | 0.60 | 0.60 | 1.32 | NG | NG | G |

FIG. 9

| | DIMENSION | | | | | | | | | CHARACTERISTIC EVALUATION | | | |
|---|---|---|---|---|---|---|---|---|---|---|---|---|---|
| | PLATE THICKNESS GT | CONDUCTIVE WIRE WIDTH WA | FIRST BEND R1 | INTERMEDIATE PORTION LENGTH GB | SECOND BEND R2 | CONDUCTOR THICKNESS G | LOWER CORE THICKNESS TD | UPPER CORE THICKNESS TU | THICKNESS T | LOW HEIGHT EVALUATION | INDUCTANCE VALUE (nH) | INDUCTANCE EVALUATION | DC RESISTANCE VALUE EVALUATION |
| SAMPLE CA1 | 0.10 | 0.50 | 0.20 | 0.00 | 0.20 | 0.40 | 0.30 | 0.20 | 0.60 | G | 10.80 | G | G |
| SAMPLE C2 | 0.10 | 0.50 | 0.20 | 0.00 | 0.20 | 0.40 | 0.30 | 0.30 | 0.70 | G | 11.50 | G | G |
| SAMPLE CA2 | 0.10 | 0.50 | 0.20 | 0.00 | 0.20 | 0.40 | 0.30 | 0.40 | 0.80 | G | 11.90 | G | G |
| SAMPLE CA3 | 0.10 | 0.50 | 0.20 | 0.00 | 0.20 | 0.40 | 0.30 | 0.50 | 0.90 | G | 12.20 | G | G |
| SAMPLE CA4 | 0.10 | 0.50 | 0.20 | 0.00 | 0.20 | 0.40 | 0.30 | 0.60 | 1.00 | NG | 12.50 | G | G |
| SAMPLE CA5 | 0.10 | 0.50 | 0.20 | 0.10 | 0.20 | 0.50 | 0.40 | 0.20 | 0.70 | G | 10.90 | G | G |
| SAMPLE CA6 | 0.10 | 0.50 | 0.20 | 0.10 | 0.20 | 0.50 | 0.40 | 0.30 | 0.80 | G | 12.30 | G | G |
| SAMPLE CA7 | 0.10 | 0.50 | 0.20 | 0.10 | 0.20 | 0.50 | 0.40 | 0.40 | 0.90 | G | 13.10 | G | G |
| SAMPLE CA8 | 0.10 | 0.50 | 0.20 | 0.00 | 0.20 | 0.40 | 0.30 | 0.40 | 0.80 | G | 12.30 | G | G |
| SAMPLE CA9 | 0.10 | 0.50 | 0.20 | 0.10 | 0.20 | 0.50 | 0.40 | 0.50 | 1.00 | NG | 13.70 | G | G |

INDUCTOR

CROSS-REFERENCE TO RELATED APPLICATION

This application claims benefit of priority to Japanese Patent Application No. 2021-054099, filed Mar. 26, 2021, the entire content of which is incorporated herein by reference.

BACKGROUND

Technical Field

The present disclosure relates to an inductor.

Background Art

WO2006/070544 A discloses a magnetic element capable of reducing an inductance value and facilitating miniaturization. In this magnetic element, a linear conductor is provided inside a core member, and a terminal electrode is provided on an outer surface of the core member.

SUMMARY

In recent years, in order to cope with high-density mounting, not only a small inductor but also a low height inductor is required, but the technique of WO2006/070544 A is insufficient for height reduction.

Accordingly, the present disclosure provides an inductor capable of achieving reduction in height while maintaining sufficient characteristics.

According to an aspect of the present disclosure, there is provided an inductor in which a conductor having a predetermined plate thickness is embedded in a core containing magnetic powder. The core includes a mounting surface facing a mounting substrate side at a time of mounting, an upper surface facing the mounting surface, and a pair of end surfaces orthogonal to the mounting surface. The conductor includes a conductive wire extending inside the core over the pair of end surfaces, and a pair of electrode terminals. The electrode terminal includes an electrode portion provided at each of both end portions of the conductive wire and exposed to the mounting surface, and a first bent portion having a first bend R and a second bent portion having a second bend R. The first bent portion and the second bent portion are provided between an end portion of the conductive wire and the electrode portion. the first bend R and the second bend R are 2.0 times or more and 3.0 times or less (i.e., from 2.0 times to 3.0 times) the plate thickness of the conductor. When one of the first bend R and the second bend R is 2.0 times or more the plate thickness of the conductor, the other is less than 3.0 times the plate thickness of the conductor.

According to the present disclosure, it is possible to obtain an inductor capable of achieving height reduction while maintaining sufficient characteristics.

BRIEF DESCRIPTION OF THE DRAWINGS

FIG. 8 is a diagram illustrating a characteristic evaluation result of inductors having different dimensions of each portion of a conductor; and FIG. 9 is a diagram illustrating a characteristic evaluation result of inductors having different upper core thicknesses and lower core thicknesses.

DETAILED DESCRIPTION

Hereinafter, embodiments of the present disclosure will be described with reference to the drawings.

Figure 1:
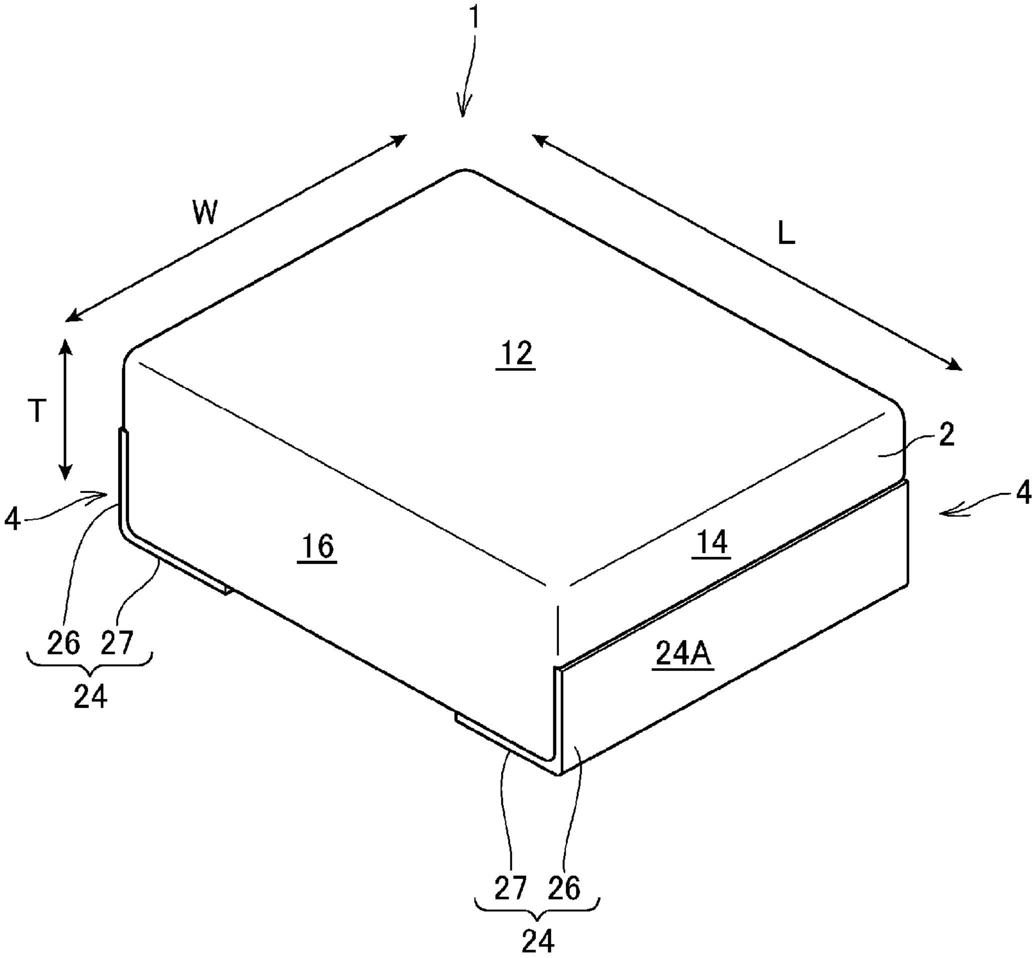
FIG. 1 is a perspective view when an inductor according to an embodiment of the present disclosure is viewed from an upper surface side.
Figure 2:
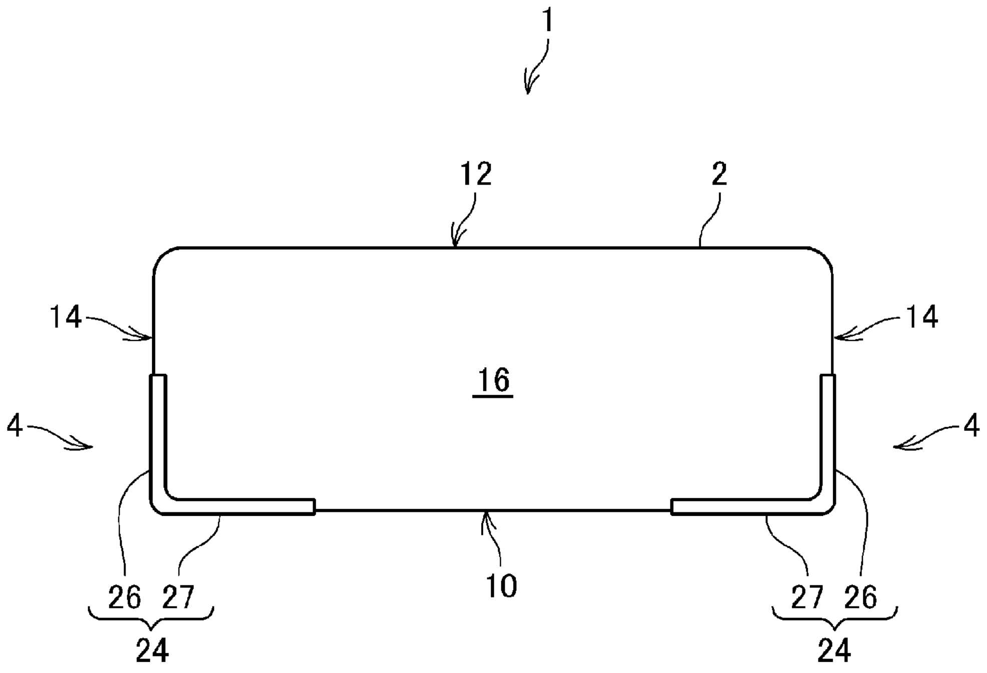
FIG. 2 is a plan view of a side surface of the inductor.
Figure 3:
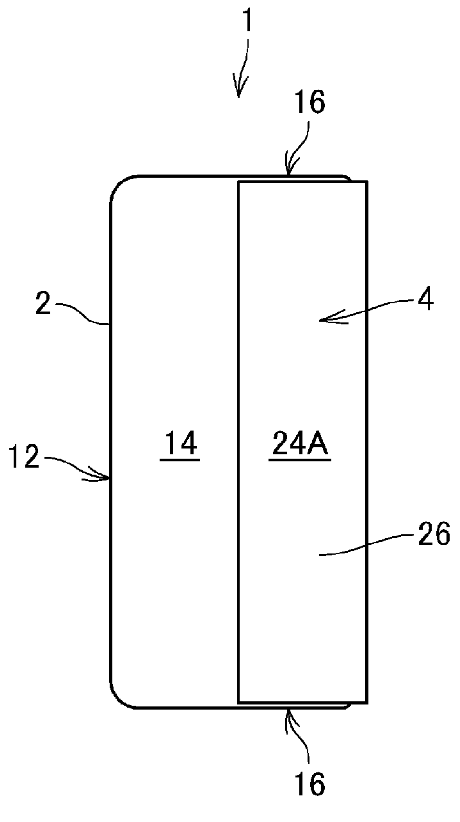
FIG. 3 is a plan view of an end surface of the inductor.
Figure 4:
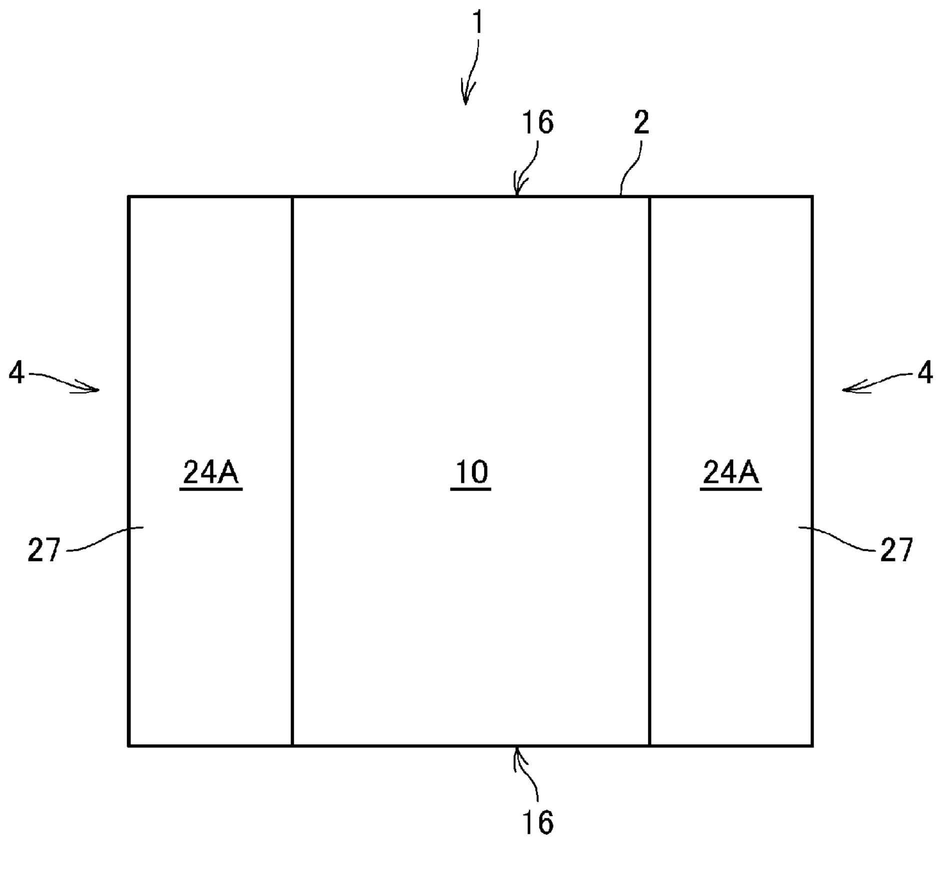
FIG. 4 is a plan view of a mounting surface of the inductor.

FIG. 1 is a perspective view when an inductor 1 according to the present embodiment is viewed from an upper surface 12 side. FIG. 2 is a plan view of a side surface 16 of the inductor 1, FIG. 3 is a plan view of an end surface 14 of the inductor 1, and FIG. 4 is a plan view of a mounting surface 10 of the inductor 1.

The inductor 1 of the present embodiment is configured as a surface mount electronic component, and includes an element body 2 having a substantially rectangular parallelepiped shape and a pair of external electrodes 4 provided on the surface of the element body 2.

Hereinafter, in the element body 2, a surface facing a mounting substrate (not illustrated) at the time of mounting is defined as a mounting surface 10 (FIG. 4), a surface facing the mounting surface 10 is referred to as an upper surface 12, a pair of surfaces orthogonal to the mounting surface 10 is referred to as end surfaces 14, and a pair of surfaces orthogonal to the mounting surface 10 and the pair of end surfaces 14 is referred to as side surfaces 16.

As illustrated in FIG. 1, a distance from the mounting surface 10 to the upper surface 12 is defined as a thickness T of the element body 2, a distance between the pair of side surfaces 16 is defined as a width W of the element body 2, and a distance between the pair of end surfaces 14 is defined as a length L of the element body 2.

Figure 5:
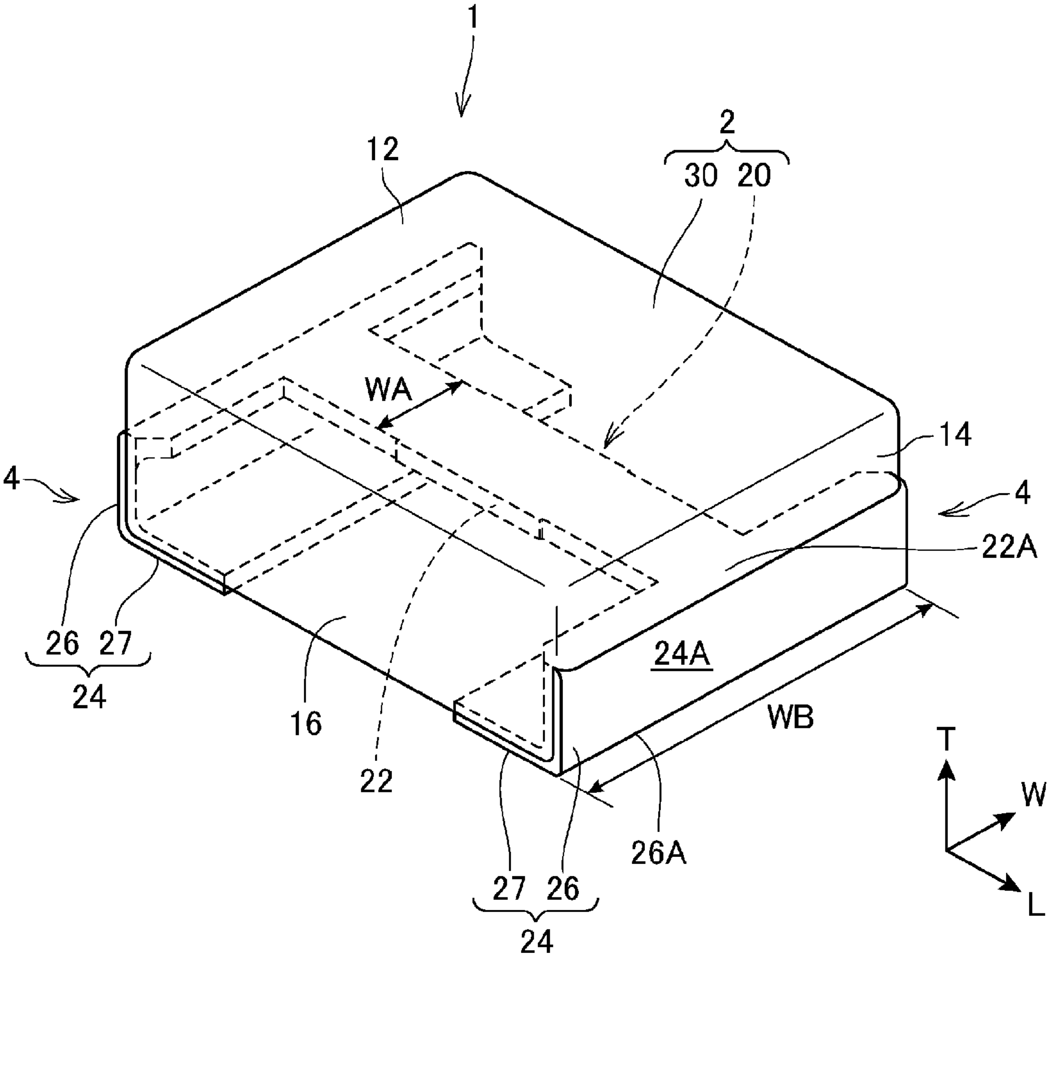
FIG. 5 is a perspective view illustrating an internal configuration of the inductor.

FIG. 5 is a perspective view illustrating an internal configuration of the inductor 1.

The element body 2 includes a conductor 20 and a core 30 having a substantially rectangular shape in which the conductor 20 is embedded, and is configured as a conductor-sealed magnetic component in which the conductor 20 is sealed in the core 30.

The core 30 is a molded body obtained by compression-molding a mixed powder obtained by mixing a magnetic powder and a resin into a substantially rectangular parallelepiped shape by pressurizing and heating the mixed powder in a state where the conductor 20 is incorporated in the core. The surface of the core 30 includes an oxide film oxidized more than the inside of the core 30. In the mixed powder of the present embodiment, barium sulfate is mixed as a lubricant in addition to the magnetic powder and the resin.

The mixed powder of the present embodiment has a resin amount of about 3.1 wt % with respect to the magnetic powder.

In addition, the magnetic powder of the present embodiment includes particles having two types of particle sizes, that is, large first magnetic particles having a relatively large average particle diameter and small second magnetic particles having a relatively small average particle diameter, and during the compression molding, the small second magnetic particles enter between the large first magnetic particles together with the resin, so that a filling factor of the core 30 can increase, and magnetic permeability can also increase.

Here, a compounding ratio (weight ratio) of the first magnetic particles and the second magnetic particles is 70:30 to 85:15, preferably 70:30 to 80:20, and 75:25 in the present embodiment.

In addition, a ratio of the average particle diameter of the first magnetic particles to the average particle diameter of the second magnetic particles is preferably 5.0 or more.

Note that the magnetic powder may include particles having an average particle diameter between the average particle diameters of the first magnetic particles and the second magnetic particles, and thus, includes particles having three or more kinds of particle sizes.

In the present embodiment, each of the first magnetic particles and the second magnetic particles is a particle having a metal particle and an insulating film covering the surface the metal particle, the metal particle is made of Fe—Si-based amorphous alloy powder, and the insulating film is made of zinc phosphate. By covering the metal particles with the insulating film, insulating resistance and withstand voltage increase.

In the first magnetic particles, Cr-less Fe—C—Si alloy powder, Fe—Ni—Al alloy powder, Fe—Cr—Al alloy powder, Fe—Si—Al alloy powder, Fe—Ni alloy powder, and Fe—Ni—Mo alloy powder may be used as the metal particles.

In the first magnetic particles and the second magnetic particles, another phosphate (magnesium phosphate, calcium phosphate, manganese phosphate, cadmium phosphate, or the like) or a resin material (silicone-based resin, epoxy-based resin, phenol-based resin, polyamide-based resin, polyimide-based resin, polyphenylene sulfide-based resin, and the like) may be used for the insulating film.

In the mixed powder of the present embodiment, an epoxy resin containing a bisphenol A type epoxy resin as a main agent is used as a material of the resin.

The epoxy resin may be a phenol novolak-type epoxy resin.

The material of the resin may be other than the epoxy resin, and may be two or more kinds instead of one kind. For example, as the material of the resin, a thermosetting resin such as a phenol resin, a polyester resin, a polyimide resin, or a polyolefin resin can be used in addition to the epoxy resin.

As illustrated in FIG. 5, the conductor 20 includes a conductive wire 22 extending inside the core 30 over the pair of end surfaces 14, and electrode terminals 24 integrally formed at both ends of the conductive wire 22.

A surface 24A of the electrode terminal 24 is exposed from each of the end surface 14 of the core 30 and the mounting surface 10, and nickel (Ni) plating and tin (Sn) plating are sequentially applied to the surfaces 24A to form the external electrode 4 in order to secure mountability. Then, the external electrode 4 formed on the mounting surface 10 is electrically connected to a wire of a circuit board by appropriate mounting means such as solder.

In the present embodiment, as illustrated in FIGS. 1 to 5, the electrode terminal 24 of the conductor 20 is embedded in the core 30 in a state where only the surface 24A is substantially exposed on the mounting surface 10 and the end surface 14, and the amount of protrusion from the core 30 is suppressed. As a result, since it is hardly necessary to consider the protrusion of the electrode terminal 24, the core 30 can be made as large as the specified size of the inductor 1, and the inductor 1 having a small size and a low height but high performance can be realized.

When a length of the conductive wire 22 in the direction of the width W of the core 30 is defined as a conductive wire width WA, and a length of the electrode terminal 24 is defined as an electrode width WB, as illustrated in FIG. 5, the electrode width WB of the electrode terminal 24 of the present embodiment is wider than the conductive wire width WA, and the resistance in DC resistance is reduced.

The electrode terminal 24 is formed in a substantially L shape on the LT cut surface on the LT plane including the respective directions of a length L and a thickness T of the core 30.

Specifically, the electrode terminal 24 includes a lead portion 26 that extends while being bent substantially vertically at an end portion 22A of the conductive wire 22 and an electrode portion 27 that extends while being bent substantially vertically at a lower end portion 26A of the lead portion 26, and the lead portion 26 and the electrode portion 27 form an L shape. The surfaces 24A of the lead portion 26 and the electrode portion 27 are exposed from the end surface 14 of the core 30 and the mounting surface 10 to constitute the external electrode 4. In addition, the conductor 20 of the present embodiment is formed by bending to be described later, and thus, the lead portion 26 between the end portion 22A of the conductive wire 22 and the electrode portion 27 has the first bent portion 70 (FIG. 7) having the first bend R and the second bent portion 72 (FIG. 7) having the second bend R.

According to the electrode terminal 24, as compared with the case where the conductive wire 22 and the electrode terminal 24 (external electrode 4) are configured separately, since there is no joint surface between the conductive wire 22, which is a low electrical resistance region of the external electrode 4 where a current mainly flows, and the electrode terminal 24 (external electrode 4), a resistance value can be suppressed, and a large current can flow.

Furthermore, the conductor 20 of the present embodiment is formed of tough pitch copper, and allows a larger current to flow.

The inductor 1 is used as a power supply circuit including a charge pump type DC-DC converter that boosts a voltage by a capacitor and a switch and an LC filter, and an impedance matching coil (matching coil) of a high frequency circuit, and is used for electronic devices such as a personal computer, a DVD player, a digital camera, a TV, a mobile phone, a smartphone, car electronics, and medical/industrial machines. However, the application of the inductor 1 is not limited thereto, and the inductor 1 can also be used for, for example, a tuning circuit, a filter circuit, a rectifying and smoothing circuit, and the like.

In the inductor 1, an element-body protective layer may be formed on the entire surface of the element body 2 excluding the range of the external electrode 4. As a material of the element-body protective layer, for example, a thermosetting resin such as an epoxy resin, a polyimide resin, or a phenol resin, or a thermoplastic resin such as a polyethylene resin or a polyamide resin can be used. These resins may further contain a filler containing silicon oxide, titanium oxide, or the like.

Figure 6:
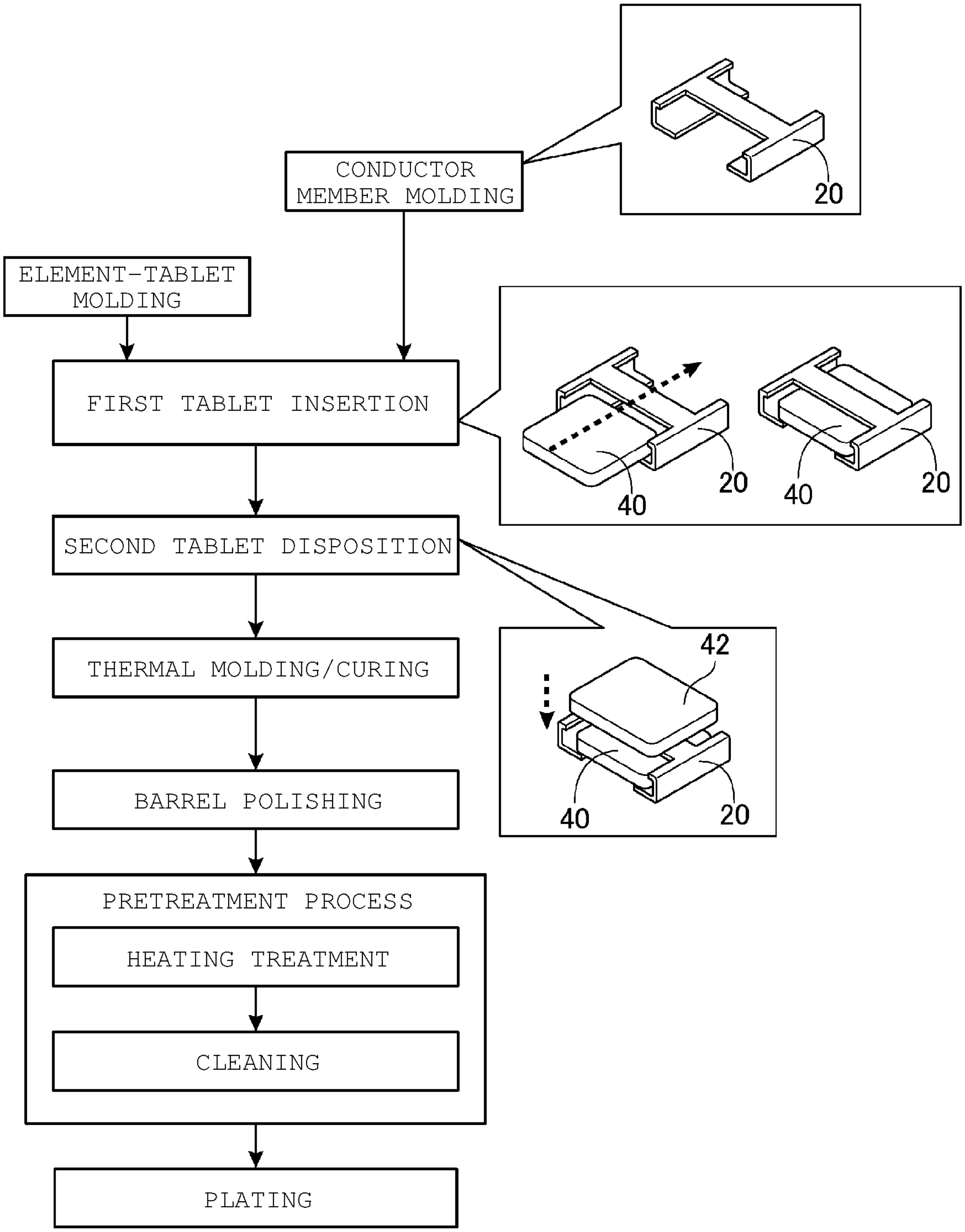
FIG. 6 is a schematic diagram of a manufacturing process of the inductor.

FIG. 6 is a schematic diagram of a manufacturing process of the inductor 1.

As illustrated in the drawing, the manufacturing process of the inductor 1 includes a conductor member molding process, an element-body tablet molding process, a first tablet inserting process, a second tablet disposing process, a thermal molding/curing process, a barrel polishing process, a pretreatment process, and a plating process.

The conductor member molding process is a process of molding the conductor 20.

In the present embodiment, first, a copper piece having a predetermined shape is formed by punching a copper plate having a predetermined thickness, and then the conductor 20 is formed by bending the copper piece. In this case, the lead portion 26 and the electrode portion 27 of the electrode terminal 24 are also bent. That is, by this conductor member molding process, the conductor 20 is formed which integrally includes the conductive wire 22 and the electrode terminal 24 and in which the lead portion 26 and the electrode portion 27 of the electrode terminal 24 are also molded in advance (that is, preformed) before being embedded in the core 30.

The tablet molding process is a process of molding two preform bodies of a first tablet 40 and a second tablet 42.

The preform body is molded into a solid state which is easy to handle by pressurizing the mixed powder which is a material of the element body 2. Each of the first tablet 40 and the second tablet 42 is a preform body disposed on the lower side and the upper side of the conductive wire 22 of the conductor 20, and is molded in a substantially plate shape.

The first tablet inserting process is a process of inserting the first tablet 40 between the pair of electrode terminals 24 on the lower side of the conductive wire 22 of the conductor 20 after setting the conductor 20 in the molding die. More specifically, the conductor 20 is provided with the electrode terminal 24 having an L shape in the LT section at both end portions 22A of the conductive wire 22, so that the LT section has a substantially C shape, and the first tablet 40 is inserted into a space surrounded by the conductive wire 22 and the pair of electrode terminals 24.

The second tablet disposing process is a process of placing the second tablet 42 on the conductive wire 22 of the conductor 20.

In the thermal molding/curing process, the first tablet 40, the conductor 20, and the second tablet 42 are integrated by applying heat to the first tablet 40 and the second tablet 42 set in the molding die while pressurizing the first tablet 40 and the second tablet 42 in an overlapping direction of the first tablet 40 and the second tablet 42 and curing them. As a result, a molded body including the conductor 20 is molded.

As described above, since the first tablet 40 is molded in a state of being accommodated in the space surrounded by the conductive wire 22 and the pair of electrode terminals 24, the conductive wire 22 is embedded in the molded body, and the molded body in which the surface of the electrode terminal 24 including the lead portion 26 and the electrode portion 27 is exposed to be substantially flush with the core 30 is obtained. In addition, since the lead portion 26 and the electrode portion 27 of the electrode terminal 24 are formed in the conductor member molding process in advance, processing for forming the lead portion 26 and the electrode portion 27 is not required for the molded body after molding.

The barrel polishing process is a process of barrel polishing the molded body, and a corner portion of the molded body is rounded by the process.

The pretreatment process is a pretreatment performed for plating the surface 24A of the electrode terminal 24, and includes a heating process and a cleaning process.

The heating process is a process of heating the molded body after the barrel polishing to oxidize the surface of the molded body.

The cleaning process is a process of cleaning the surface 24A of the electrode terminal 24 by immersing (that is, by wet etching) the molded body in a liquid agent that dissolves only the members of the electrode terminal 24 (conductor 20).

The plating process is a process of sequentially applying nickel (Ni) plating and tin (Sn) plating on the surface 24A of the electrode terminal 24 by barrel plating. Here, since the surface of the molded body is oxidized in the heating process, in the plating process, occurrence of so-called "plating elongation" in which plating extends from the surface 24A of the electrode terminal 24 to the surface of the molded body is suppressed.

Next, the height reduction of the inductor 1 will be described in more detail.

Figure 7:
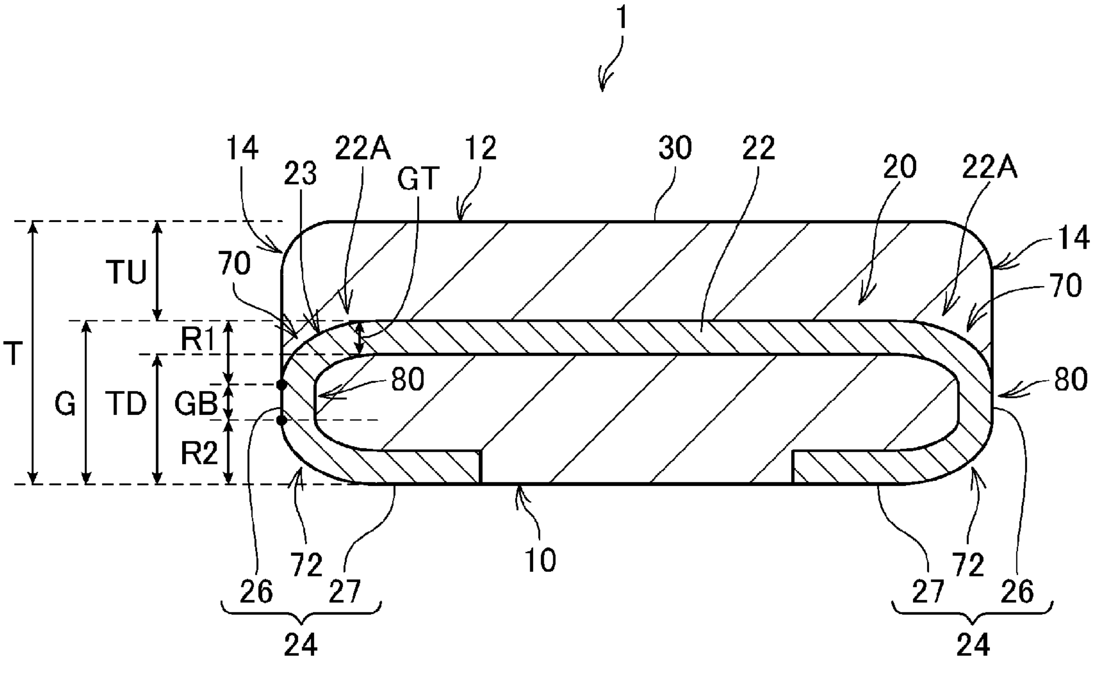
FIG. 7 is a view schematically illustrating an LT section of the inductor.

FIG. 7 is a view schematically illustrating the LT section of the inductor 1.

The LT sectional shape of the inductor 1 (core 30) is a substantially rectangular shape having the thickness T as a short side and the length L as a long side.

In addition, the conductor 20 includes the conductive wire 22 extending linearly in the direction of the length L substantially parallel to the mounting surface 10 corresponding to the bottom surface at the time of mounting, and a substantially L-shaped electrode terminal 24 connected to both end portions 22A of the conductive wire 22, and the electrode terminal 24 extends along the end surface 14 and the mounting surface 10. Thus, the conductor 20 has a substantially C-shaped shape opened on the mounting surface 10 side in the LT section.

As described above, the conductor 20 is formed by bending a metal piece before being embedded in the core 30. The bending is a processing of bending a metal piece into an L shape at an abutting location in a state where a bending tool having a bend R (curvature radius) abuts on the location to be bent into the L shape. The bending is performed on each of the connection portion between the end portion 22A of the conductive wire 22 and the lead portion 26 of the electrode terminal 24 and the connection portion between the lower end portion 26A of the lead portion 26 and the electrode portion 27, and thus, the first bent portion 70 and the second bent portion 72 having an L shape and having a bend R (curvature radius) at each location are formed. By forming the conductor 20 by the bending, as described above, the conductor 20 includes two bent portions of the first bent portion 70 and the second bent portion 72 in order between the end portion 22A of the conductive wire 22 and the electrode portion 27.

Hereinafter, the bend R of the first bent portion 70 is referred to as a first bend R1, and the bend R of the second bent portion 72 is referred to as a second bend R2. In the present embodiment, the first bend R1 and the second bend R2 refer to so-called outer R, and are curvatures of an outer circumferential surface 23 which is a surface on the surface side of the core 30 in the LT section of the conductor 20.

The values of the first bend R1 and the second bend R2 are obtained by calculation on the basis of measured values of a distance from the center of bending to the outer circumferential surface 23 in each of the length L direction, the thickness T direction, and an intermediate direction (direction inclined by 45° from the length L direction to the thickness T direction) between the length L direction and the thickness T direction of the inductor 1 in the LT section of the conductor 20.

In the present embodiment, the plate thickness GT of the conductor 20 is a thickness of the connection location of the first bent portion 70 with the end portion 22A of the conductive wire 22.

Here, in the inductor 1 of the present embodiment, the electrode terminal 24 of the conductor 20 is preformed (preformed before being embedded in the core 30), and thus, the mounting surface 10 and the surface 24A of the electrode portion 27 are substantially flush with each other.

Therefore, as illustrated in FIG. 7, when the thickness of the conductor 20 is the conductor thickness G and the thickness of the core 30 above the conductor 20 is the upper core thickness TU, the thickness T of the inductor 1 is (conductor thickness G+upper core thickness TU), and the height is reduced as the conductor thickness G is reduced.

When a portion between the first bent portion 70 and the second bent portion 72 is defined as an intermediate portion 80 and a length of the intermediate portion 80 is defined as GB, the conductor thickness G is equal to a length obtained by adding the first bend R1, the second bend R2, and the length GB of the intermediate portion 80 as illustrated in FIG. 7. Therefore, for example, by setting the length GB of the intermediate portion 80 to 0 and minimizing the first bend R1 and the second bend R2, the conductor thickness G can be minimized. Of the first bent portion 70, the second bent portion 72, and the intermediate portion 80, a location portion exposed to the end surface 14 corresponds to the lead portion 26.

Here, in the bending, it has been found that the minimum bend R that allows the conductor 20 to be bent without thinning the plate thickness GT of the conductor 20 in the bent portion is about 2 times the plate thickness GT. That is, when the bend R of the first bend R1 and the second bend R2 is less than twice the plate thickness GT, the plate thickness is deformed to be thin in the first bent portion 70 and the second bent portion 72, and thus, the resistance value increases, and the DC resistance characteristics of the inductor 1 is deteriorated.

Therefore, by setting the first bend R1 and the second bend R2 to be twice or more the plate thickness GT of the conductor 20, deterioration of the DC resistance characteristics can be avoided. In addition, by setting the first bend R1 and the second bend R2 to be twice the plate thickness GT, the conductor thickness G can be minimized while deterioration of the DC resistance characteristics is avoided, and the height of the inductor 1 can be reduced.

In addition, the inductor 1 according to the present embodiment is configured such that the first bend R1 and the second bend R2 are made twice the plate thickness GT, and the inductor 1 has a small and low height of 2.5±0.2 mm in length L, 2.0±0.2 mm in width W, and less than 1.0 mm in thickness T, but has excellent characteristics of a DC resistance value of less than 1 mΩ, an inductance value of more than 10 nH, a rated temperature rise current (when the temperature rises by 40° C.) of 15 A or more, and a DC superimposed current value (when the frequency is 1 MHz) of 15 A or more.

Hereinafter, such a configuration will be described in detail.

FIG. 8 is a diagram illustrating a characteristic evaluation result of the inductor 1 in which dimensions of each portion of the conductor 20 are different.

In the figure, the lower core thickness TD is the thickness of the core 30 below the conductor 20, and the characteristic evaluation results are the evaluation results of the low height, the inductance value, and the DC resistance value. In a low height evaluation, the inductor 1 having a thickness T of less than 1 mm is evaluated as "G" (good product), in the inductance value evaluation, the inductor 1 having an inductance value larger than 10 nH is evaluated as "G" (good product), and in the DC resistance value evaluation, the inductor 1 having a DC resistance value of less than 1 mΩ is evaluated as "G" (good product). In any of the inductors 1, relative permeability of the core 30 is in the range of 23.5 to 29.5.

Since the DC resistance of the inductor 1 increases as the plate thickness GT decreases, it is necessary to make the plate thickness GT thicker than the minimum plate thickness corresponding to the desired value in order to suppress the DC resistance to be equal to or less than the desired value. Then, in the configuration in which the inductor 1 is formed to have the size described above and the electrode width WB of the electrode terminal 24 (electrode portion 27) is wider than the conductive wire width WA of the conductive wire 22, it can be seen from the comparison of the DC resistance value evaluation between the sample groups of samples A1 to B3 and the sample groups of samples C1 to D2 in FIG. 8 that the plate thickness GT of at least 0.1 mm or more is necessary in order to suppress the DC resistance value to less than 1 mΩ and realize the relatively large temperature increase rated current.

However, as the plate thickness GT is thicker than 0.1 mm, it is more difficult to reduce the height, but according to the low height evaluation result for the sample D1, it can be seen that the thickness T of less than 1 mm can be realized when the plate thickness GT is at least 0.12 mm.

Further, according to the low height evaluation results of the samples C1, C2, C3, and C4 and the samples D1 and D2, in a case where the plate thickness GT is 0.1 mm or more and 0.12 mm or less (i.e., from 0.1 mm to 0.12 mm), when the first bend R1 and the second bend R2 become 3.0 times or more the plate thickness GT, the thickness T exceeds 1 mm Therefore, in order to realize the thickness T of less than 1 mm, when one of the first bend R1 and the second bend R2 is 2.0 times or more the plate thickness GT, the other needs to be less than 3.0 times the plate thickness GT.

FIG. 9 is a diagram illustrating a characteristic evaluation result of the inductor 1 having different upper core thicknesses TU and lower core thicknesses TD. In the drawing, all the samples of the inductor 1 have a plate thickness GT of 0.1 mm, and the first bend R1 and the second bend R2 are 2.0 times the plate thickness GT.

In the inductor 1 according to the present embodiment, the lower core thickness TD corresponds to a thickness obtained by subtracting the plate thickness GT from the conductor thickness G as illustrated in FIG. 7, and thus the lower core thickness TD is also substantially constant when the dimensions of the conductor 20 are the same.

Meanwhile, the upper core thickness TU can be changed regardless of the dimension of the conductor 20, and it can be seen that a higher inductance value can be obtained as the upper core thickness TU increases as illustrated in FIG. 9. Therefore, the inductance value can be increased by increasing the upper core thickness TU in the range (that is, the thickness T falls within a range of less than 1 mm) in which the low height evaluation is "G".

In addition, in the conductor 20, as the length GB of the intermediate portion 80 is made longer from 0, the lower core thickness TD becomes thicker, and the balance between the upper core thickness TU and the lower core thickness TD in the inductor 1 is changed, and thus, the inductance value is also affected.

Specifically, in FIG. 9, when the inductance value is compared between the case where the length GB of the intermediate portion 80 is 0 and the case where the length GB is 0.1 mm (approximately the plate thickness GT), it can be seen that the inductance value is larger when the length GB of the intermediate portion 80 is 0.1 mm as long as the upper core thickness TU is the same.

That is, by providing the intermediate portion 80 having the length GB corresponding to the plate thickness GT in the conductor 20, a larger inductance value can be obtained. In particular, when the inductor 1 includes the intermediate portion 80 having a length GB of 0.1 mm, it is found from the results of the samples CA5 to CA7 and the sample CA9 that when the difference between the lower core thickness TD and the upper core thickness TU is 0.1 mm corresponding to the plate thickness GT, an inductance value exceeding 12 nH is obtained.

However, it can be seen from the results of the sample CA9 that in a case where the upper core thickness TU is larger than the lower core thickness TD, when the difference between the two is equal to or larger than the plate thickness GT, the thickness T is 1 mm, and the low height evaluation is "NG". In other words, when the upper core thickness TU is larger than the lower core thickness TD, the thickness T can be suppressed to less than 1 mm by setting the difference between the upper core thickness TU and the lower core thickness TD to be less than the plate thickness GT.

According to the present embodiment, the following effects are obtained.

The inductor 1 of the present embodiment is the inductor 1 in which the conductor 20 having the predetermined plate thickness GT is embedded in the core 30 containing magnetic powder. The core 30 includes the mounting surface 10 facing the mounting substrate side at the time of mounting, the upper surface 12 facing the mounting surface 10, and the pair of end surfaces 14 orthogonal to the mounting surface 10. The conductor 20 includes the conductive wire 22 extending through the inside of the core 30 across the pair of end surfaces 14 and the pair of electrode terminals 24. The pair of electrode terminals 24 includes the electrode portion 27 provided at each of both end portions 22A of the conductive wire 22 and exposed to the mounting surface 10, and the first bent portion 70 having the first bend R1 and the second bent portion 72 having the second bend R2, which are provided between both end portions 22A of the conductive wire 22 and the pair of electrode portions 27, respectively. The first bend R1 and the second bend R2 are 2.0 times or more and 3.0 times or less (i.e., from 2.0 times to 3.0 times) the plate thickness GT of the conductor 20, and when one of the first bend R1 and the second bend R2 is 2.0 times or more the plate thickness GT of the conductor 20, the other is less than 3.0 times the plate thickness GT of the conductor 20.

According to this configuration, since the first bend R and the second bend R are 2.0 times or more and 3.0 times or less (i.e., from 2.0 times to 3.0 times) the plate thickness GT of the conductor 20, and when one of the first bend R and the second bend R is 2.0 times or more the plate thickness GT of the conductor 20, the other is less than 3.0 times the plate thickness GT of the conductor 20. Therefore, it is possible to limit the conductor thickness G of the conductor 20 while avoiding deterioration of the DC resistance characteristics due to an increase in the resistance value in the first bent portion 70 and the second bent portion 72, and to realize reduction in the height of the inductor 1.

In the inductor 1, although the lower core thickness TD is a thickness obtained by subtracting the plate thickness GT from the conductor thickness G, the inductance value can be appropriately increased by increasing the upper core thickness TU as long as the thickness T of the inductor 1 allows (within a range in which the reduction in height is not impaired).

In the inductor 1 of the present embodiment, since the electrode width WB of the electrode portion 27 is wider than the conductive wire width WA of the conductive wire 22, the DC resistance value can be reduced.

In the inductor 1 according to the present embodiment, the conductor 20 has a plate thickness GT of 0.1 mm or more and 0.12 mm or less (i.e., from 0.1 mm to 0.12 mm).

This makes it possible to suppress the thickness T of the inductor 1 to less than 1 mm while achieving a sufficiently low DC resistance value.

The inductor 1 of the present embodiment includes the intermediate portion 80 having a length equal to the plate thickness GT of the conductor 20 between the first bent portion 70 and the second bent portion 72.

As a result, the inductance value can be increased as compared with the case where the intermediate portion 80 is not provided (the length GB of the intermediate portion 80 is substantially 0).

In the inductor 1 of the present embodiment, the bend R of each of the first bent portion 70 and the second bent portion 72 is 2.0 times the plate thickness GT of the conductor 20, and the difference between the lower core thickness TD and the upper core thickness TU of the core 30 is equal to or less than the plate thickness GT.

According to this configuration, though the conductor 20 has the intermediate portion 80 having a length equal to the plate thickness GT of the conductor 20, the bend R of each of the first bent portion 70 and the second bent portion 72 is set to 2.0 times the plate thickness GT of the conductor 20, and thus, the conductor thickness G is suppressed to the minimum within a range in which deterioration of the DC resistance characteristics can be avoided, and the height of the inductor 1 can be realized.

In the inductor 1 according to the present embodiment, the upper core thickness TU is larger than the lower core thickness TD, and the difference between the upper core thickness TU and the lower core thickness TD is less than the plate thickness GT of the conductor 20.

As a result, though the upper core thickness TU is larger than the lower core thickness TD, the thickness T can be kept less than 1 mm.

Note that the above-described embodiment is merely an example of one aspect of the present disclosure, and can be arbitrarily modified and applied without departing from the gist of the present disclosure.

For example, in the above-described embodiment, in the conductor 20, the magnitude of the first bend R1 of the first bent portion 70 and the magnitude of the second bend R2 of the second bent portion 72 may be interchanged.

The directions such as horizontal and vertical directions, various numerical values, shapes, and materials in the above-described embodiment include a range (so-called equivalent range) in which the same functions and effects as those of the directions, numerical values, shapes, and materials are exhibited unless otherwise specified.

What is claimed is:

1. An inductor comprising:

a core containing magnetic powder, and a conductor having a plate thickness which is embedded in the core, wherein the core includes a mounting surface facing a mounting substrate side at a time of mounting, an upper surface facing the mounting surface, and a pair of end surfaces orthogonal to the mounting surface, the conductor includes a conductive wire extending inside the core over the pair of end surfaces, and a pair of electrode terminals, each of the electrode terminals includes an electrode portion at a respective one of end portions of the conductive wire and exposed to the mounting surface, a first bent portion having a first bend and a second bent portion having a second bend, the first bent portion and the second bent portion being between the respective one of the end portions of the conductive wire and the electrode portion, and each of the first bend and the second bend is from 2.0 times to 3.0 times the plate thickness of the conductor, and when one of the first bend and the second bend is 2.0 times or more the plate thickness of the conductor, the other of the first bend and the second bend is less than 3.0 times the plate thickness of the conductor.

2. The inductor according to claim 1, wherein a width of the electrode portion is wider than a width of the conductive wire.

3. The inductor according to claim 2, wherein the plate thickness of the conductor is from 0.1 mm to 0.12 mm.

4. The inductor according to claim 3, wherein at each of the electrode terminals, the conductor includes an intermediate portion between the first bent portion and the second bent portion, and the intermediate portion has a length equal to the plate thickness of the conductor.

5. The inductor according to claim 4, wherein each of the first bend and the second bend is 2.0 times the plate thickness of the conductor, and in the core, a difference between a lower core thickness that is a thickness of the core from the conductive wire to the mounting surface and an upper core thickness that is a thickness of the core from the conductive wire to the upper surface is equal to or less than the plate thickness of the conductor.

6. The inductor according to claim 5, wherein the upper core thickness is larger than the lower core thickness, and the difference between the upper core thickness and the lower core thickness is less than the plate thickness of the conductor.

7. The inductor according to claim 2, wherein at each of the electrode terminals, the conductor includes an intermediate portion between the first bent portion and the second bent portion, and the intermediate portion has a length equal to the plate thickness of the conductor.

8. The inductor according to claim 7, wherein each of the first bend and the second bend is 2.0 times the plate thickness of the conductor, and in the core, a difference between a lower core thickness that is a thickness of the core from the conductive wire to the mounting surface and an upper core thickness that is a thickness of the core from the conductive wire to the upper surface is equal to or less than the plate thickness of the conductor.

9. The inductor according to claim 8, wherein the upper core thickness is larger than the lower core thickness, and the difference between the upper core thickness and the lower core thickness is less than the plate thickness of the conductor.

10. The inductor according to claim 1, wherein at each of the electrode terminals, the conductor includes an intermediate portion between the first bent portion and the second bent portion, and the intermediate portion has a length equal to the plate thickness of the conductor.

11. The inductor according to claim 10, wherein each of the first bend and the second bend is 2.0 times the plate thickness of the conductor, and in the core, a difference between a lower core thickness that is a thickness of the core from the conductive wire to the mounting surface and an upper core thickness that is a thickness of the core from the conductive wire to the upper surface is equal to or less than the plate thickness of the conductor.

12. The inductor according to claim 11, wherein the upper core thickness is larger than the lower core thickness, and the difference between the upper core thickness and the lower core thickness is less than the plate thickness of the conductor.

* * * * *